(12) United States Patent
Gross et al.

(10) Patent No.: US 6,789,049 B2
(45) Date of Patent: Sep. 7, 2004

(54) DYNAMICALLY CHARACTERIZING COMPUTER SYSTEM PERFORMANCE BY VARYING MULTIPLE INPUT VARIABLES SIMULTANEOUSLY

(75) Inventors: Kenny C. Gross, San Diego, CA (US); Wendy Lu, La Jolla, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 39 days.

(21) Appl. No.: 10/146,101

(22) Filed: May 14, 2002

(65) Prior Publication Data

US 2003/0216890 A1 Nov. 20, 2003

(51) Int. Cl.⁷ .......................... G06F 11/30; G06F 15/00
(52) U.S. Cl. ..................................................... 702/186
(58) Field of Search .............................. 702/109, 112, 702/118, 120, 182, 186

(56) References Cited

U.S. PATENT DOCUMENTS

2002/0049687 A1 * 4/2002 Helsper et al. ................ 706/45
2002/0198684 A1 * 12/2002 Gross et al. ................ 702/186

OTHER PUBLICATIONS

Publication entitled "Concentric–Sphere Design for Spacing of Tag–Gas Isotopic Ratios," by Kenny C. Gross, Nuclear Technology, vol. 45, Sep. 1979, pp. 195–196.

Publication entitled "Sinusoidal Source Perturbation Experiments with a Breached Fuel Subassembly in the Experimental Breeder Reactor II," by Kenny C. Gross et al., Nuclear Technology, vol. 98, Apr. 1992, pp. 113–123.

Publication entitled "Investigation of Nonrecoil Fission–Product Release Phenomena Using Multifrequency Source–Perturbation Experiments in EBR–II," by Kenny C. Gross et al., Nuclear Energy, vol. 13, No. 8, 1986, pp. 419–441.

Publication entitled "Analysis of Fission–Product Release Mechanisms Using Bifrequency Reactivity–Oscillation Tests in EBR–II," by Kenny C. Gross, International Fast Reactor Safety Meeting, Aug. 12–16, 1990.

* cited by examiner

Primary Examiner—Michael Nghiem
(74) Attorney, Agent, or Firm—Park, Vaughan & Fleming LLP

(57) ABSTRACT

One embodiment of the present invention provides a system that dynamically characterizes computer system performance. The system operates by simultaneously varying multiple input variables in the computer system, and gathering performance results by measuring time-dependent responses in one or more response variables. In this way, responses to variations in the multiple input variables can be measured simultaneously. Next, the system analyzes the performance results to determine correlations between input variables and output variables.

24 Claims, 6 Drawing Sheets

DYNAMICALLY CHARACTERIZING COMPUTER SYSTEM PERFORMANCE BY VARYING MULTIPLE INPUT VARIABLES SIMULTANEOUSLY

RELATED APPLICATION

The subject matter of this application is related to the subject matter in a non-provisional application by Kenny C. Gross and David M. Fishman, entitled, "Method and Apparatus To Facilitate Measurement of Quality-Of-Service Performance of a Network Server," Ser. No. 09/887,944, filed 22 Jun. 2001 now abandoned.

BACKGROUND

1. Field of the Invention

The present invention relates to the process of measuring the performance of computer systems. More specifically, the present invention relates to a method and an apparatus for dynamically characterizing computer system performance by varying multiple input variables simultaneously.

2. Related Art

Current methods for qualification testing of enterprise computing systems involve putting a maximum expected load on one or more input variables, and seeing if the system crashes. While this type of qualification testing is necessary, dynamical system characterization can provide a far greater wealth of information that is useful for designing robust systems that deliver optimal Quality-of-Service (QOS) performance over a large range of system parameters.

Dynamical system characterization involves introducing perturbations in one or more "input" variables, and measuring the time-dependent responses in one or more "response" variables. Typical input variables of interest can include those associated with load on the CPU, load on the memory, or I/O traffic to disk. Typical response variables of interest can include physical variables such as local temperatures, voltages, or currents; or a large range of what are called Quality-of-Service (QOS) variables. QOS variables can also include a variety of "wait times" that users experience when interacting with large Web centers. For example, QOS variables may include: the wait time after clicking on a shopping cart; the time to return a database query; or the time to process an FTP request to download a file.

Dynamical system characterization asks, "For a perturbation of x % in input variable A, what is the variation in response variable B?" We quantify this relationship with a "dynamic coupling coefficient" between A and B. This coupling coefficient, C, may be a function of load, or, more generally, may be a multivariate function of multiple input variables. There may be a linear relationship between input A and response B; or the relationship may be highly nonlinear.

One can make an analogy with structural mechanics for airplanes. Static load testing may show that structural elements are strong enough to withstand all expected loads for a plane. However, resonances may exist wherein small vibrations are nonlinearly amplified, leading to catastrophic failures. Early airplane designers learned that it is crucially important to do dynamic response testing to learn if such structural resonances exist.

For computing systems, numerous phenomena have been identified that can lead to nonlinear coupling between small fluctuations in input variables and response variables. For example, if memory usage is near the limit of available memory, applications will swap to disk, a process that is much slower. For this reason, when stochastic load variations occur with lots of available memory remaining, coupling with QOS response variables is linear, has small coupling coefficients, and has extremely small phase-shifts (lag times) between input and response variables. However, when the same stochastic load variations occur near the limit of available memory, there is a strongly nonlinear coupling between input and response variables, and with a measurable phase-shift.

Similar nonlinear coupling between input variables and response variables has been observed in online transaction processing (OLTP) systems with a phenomenon called latch contention. Moreover, in networked systems that are bandwidth constrained, packet collisions can lead to non-linearities in QOS latencies. Hence, there are many phenomena within computer systems that can lead to nonlinear dynamical interaction effects between input variables and a multitude of physical and QOS response variables.

Hence, what is needed is a method and an apparatus for dynamically characterizing computer system performance.

Although existing tools can measure and log these QOS variables as a function of time, there are no tools that permit the diagnosis of interaction effects between and among the various QOS variables. A system analyst may be interested in the answers to questions such as: (1) If I have 10,000 email users this month, and I add 2,000 new email accounts next month, how will the increased email traffic impact my database users' wait times? (2) What impact do 8,000 animated browser banners have on download latency times for my 3,000 active file transfer protocol (FTP) users—and vice versa? (3) What impact do 4,000 active portable document format (PDF) file viewers have on transaction processing system (TPS) throughput? In general, what impact does the instantaneous demand for performance variable X produce in performance variable Y?

Attempting to measure the impact that one variable has on another variable is difficult, at best. One way of attempting to measure this interaction is to create a step increase in the number of transactions of one category and search for a change in the response, or wait, time in transactions of another category. The ability to find a change in the wait time in a second category of transaction requires the step increase in the first category of transaction to be relatively large. However, using a large step increase is undesirable because the large step increase may adversely affect the response time in the first variable at the same time. Additionally, if the step increase is too large, the increase can cause the system to fail, or "crash."

Hence, what is needed is a method and an apparatus to quantify the interaction of QOS variables.

Another problem is that the process of dynamically characterizing computer system performance can be extremely time-consuming. For example, a test involving a single input variable can require up to several hours. Consequently, a test involving multiple input variables can potentially take many days, which is an unacceptable amount of time in most testing contexts.

What is needed is a method and an apparatus for dynamically characterizing computer system performance through tests involving multiple input variables without requiring an undue amount of time.

SUMMARY

One embodiment of the present invention provides a system that dynamically characterizes computer system performance. The system operates by simultaneously varying multiple input variables in the computer system, and gathering performance results by measuring time-dependent responses in one or more response variables. In this way, responses to variations in the multiple input variables can be measured simultaneously. Next, the system analyzes the performance results to determine correlations between input variables and output variables.

In a variation on this embodiment, varying the multiple input variables involves using the concentric-hypersphere perturbation technique to generate very nearly ideal sinusoidal impulsional perturbations in the multiple input variables simultaneously.

In a variation on this embodiment, varying the multiple input variables involves varying a single input variable using a composite periodic disturbance comprising multiple distinct frequencies.

In a variation on this embodiment, varying the multiple input variables involves using multiple amplitudes for varying a single input variable.

In a variation on this embodiment, analyzing the performance results involves performing a normalized cross power spectral density (NCPSD) analysis on the performance results.

In a variation on this embodiment, simultaneously varying the multiple input variables involves generating a pattern of synthetic transactions, and then sending the pattern of synthetic transactions to the computer system to be processed. (Note that "synthetic transactions" are transactions that are generated for the performance measurement purposes, and are not part of the computer system's normal workload.)

In a further variation, the pattern of synthetic transactions is sent to the computer system while the computer system is processing a normal workload, so that the pattern of synthetic transactions is added to the normal workload.

In a further variation, the pattern of synthetic transactions includes a varying pattern of synthetic transactions.

In a further variation, the pattern of transactions additionally includes a fixed pattern of synthetic transactions.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Clients and Servers

Figure 1:
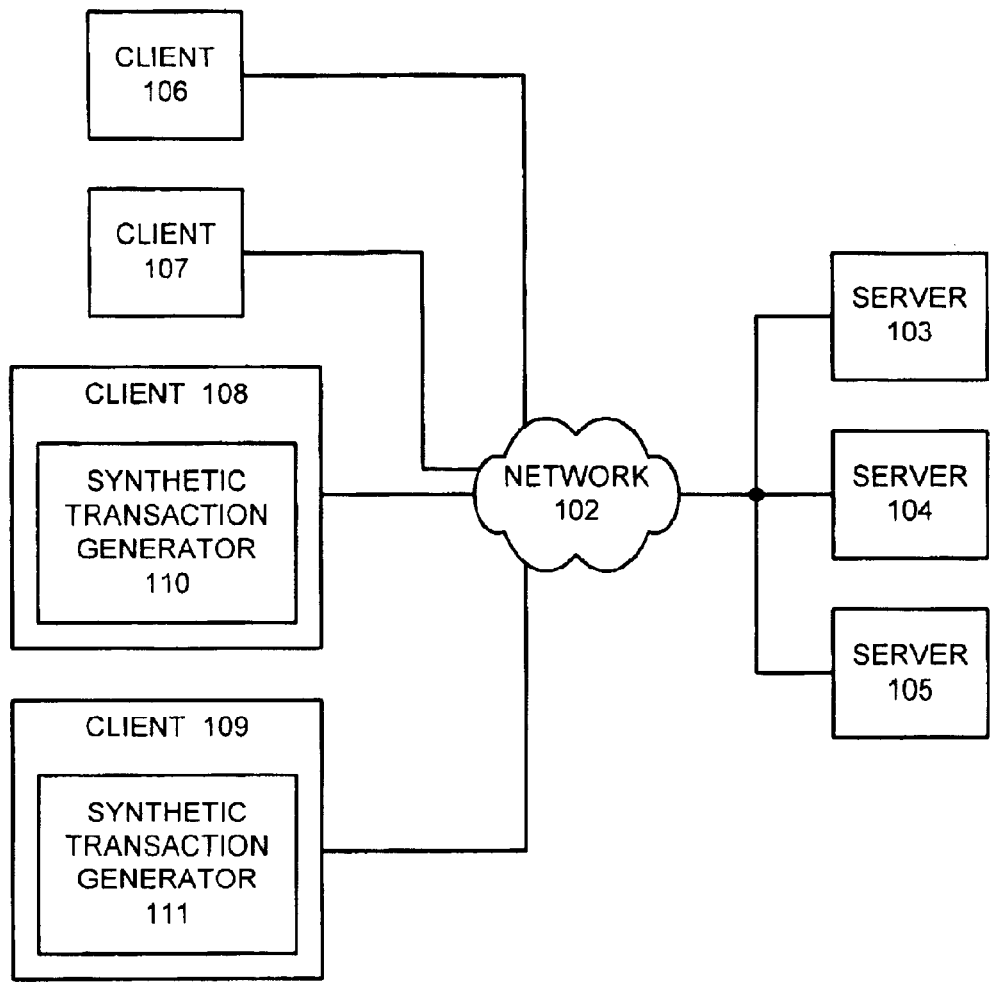
FIG. 1 illustrates a number of clients coupled to a number of servers in accordance with an embodiment of the present invention.

FIG. 1 illustrates a number of clients 106–109 coupled to a number of servers 103–105 through a network 102 in accordance with an embodiment of the present invention.

Network 102 can generally include any type of wire or wireless communication channel capable of coupling together computing nodes. This includes, but is not limited to, a local area network, a wide area network, or a combination of networks. In one embodiment of the present invention, network 102 includes the Internet.

Clients 106–109 can generally include any node on network 102 including computational capability and including a mechanism for communicating across the network. Clients 106–109 can be positioned at sites that are geographically separated from servers 103–105 and from each other. Servers 103–105 can generally include any nodes on network 102 including a mechanism for servicing requests from clients 106–109 for computational and/or data storage resources.

Clients 106–109 and servers 103–105 reside in computer systems, which can generally include any type of computer system, including, but not limited to, a computer system based on a microprocessor, a mainframe computer, a digital signal processor, a portable computing device, a personal organizer, a device controller, and a computational engine within an appliance.

Clients 108 and 109 include synthetic transaction generators 110 and 111, respectively. During operation, synthetic transaction generators 110 and 111 generate synthetic transactions for servers 103–105. These synthetic transactions are sent to servers 103–105 across network 102 and are processed up to the point where the transaction would be committed. The transaction is then cancelled, saving only the response time for the transaction to be committed.

Synthetic transaction generators 110 and 111 generate synthetic transactions for the categories of services that are available on servers 103–105. These synthetic transactions can include, but are not limited to, file transfers, downloads, database queries, email transactions, browser advertising banners, office applications, PDF file viewers, calendar updates, code executions, and file compressions.

The synthetic transaction generators place small, typically sinusoidal, variations in the number of transactions for one category of service while holding the number of transactions in the other categories of service constant. The response times for the synthetic transactions are stored in a table, which is subsequently analyzed using mathematical techniques to determine the effects on response times in the other categories of service caused by the variations in the number of transactions in the category of service being varied. The number of synthetic transactions can be low—an order of magnitude or more lower—compared to the number of real transactions being handled by servers 103–105 in order to prevent the synthetic transactions from significantly affecting server performance. Moreover, the period of the sinusoid that is varying the synthetic transactions can be very long, possibly measured in hours.

Furthermore, synthetic transaction generators 110 and 111 can possibly generate transaction workloads that vary more than one input variable at a time in order to measure the performance of servers 103–105. This process is described in more detail below with reference to FIGS. 5–6.

Although the present invention is described in the context of a computer system that includes multiple servers, the present invention can generally be applied to measuring the performance of any type of computer system. For example, the present invention can be applied to measure the performance of a single server, or to measure the performance of a standalone computer system that is not coupled to a network.

Synthetic Transaction Generator

Figure 2:
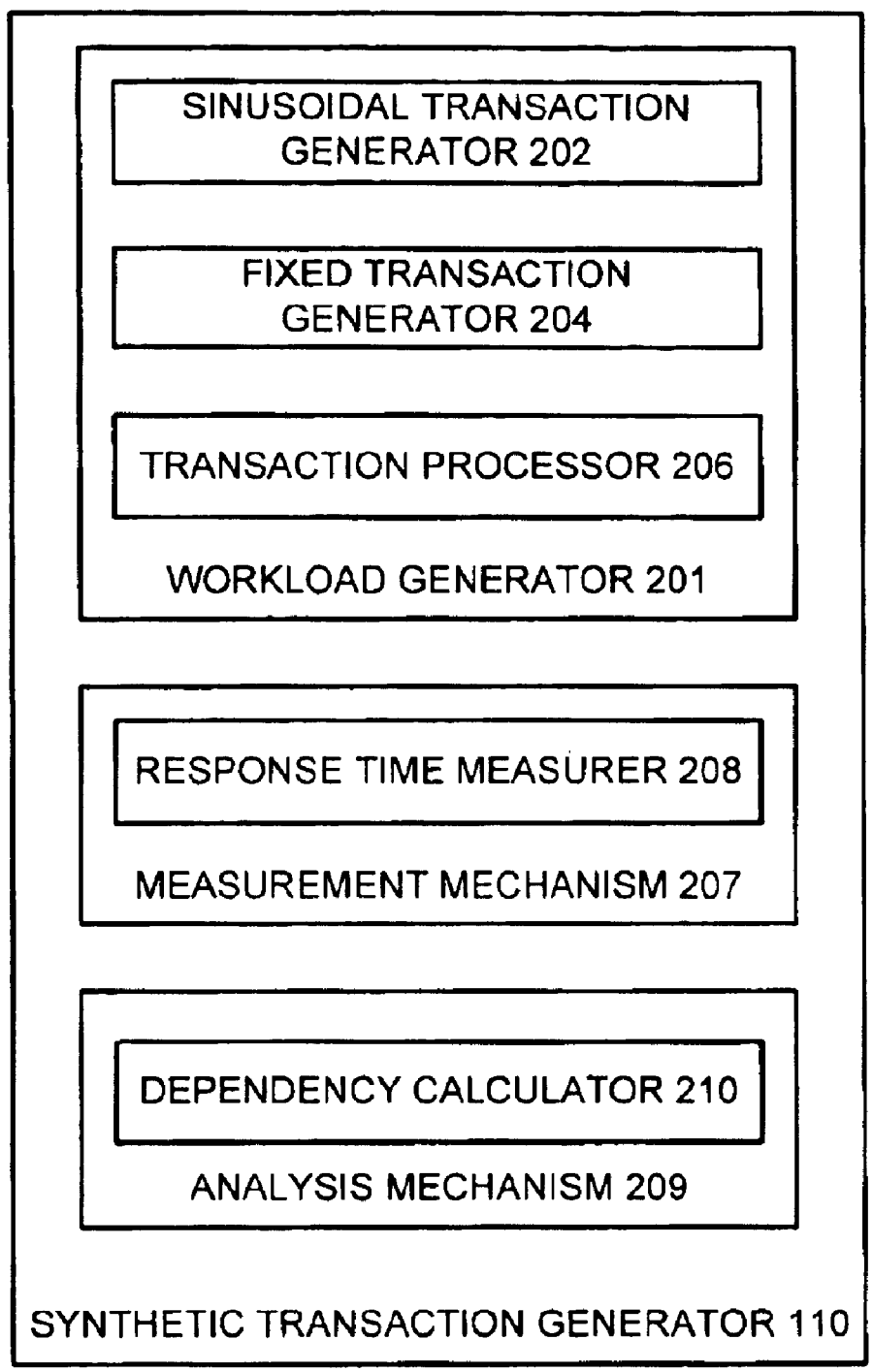
FIG. 2 illustrates a synthetic transaction generator in accordance with an embodiment of the present invention.

FIG. 2 illustrates synthetic transaction generator 110 in accordance with an embodiment of the present invention. Synthetic transaction generators 110 and 111 from FIG. 1 are similar, so only synthetic transaction generator 110 will be discussed herein. Synthetic transaction generator 110 contains a number of components, including workload generator 201, measurement mechanism 207, and analysis mechanism 209. Workload generator 201 includes sinusoidal transaction generator 202, fixed transaction generator 204, and transaction processor 206. Measurement mechanism 207 includes response time measurer 208. Analysis mechanism 209 includes dependency calculator 210.

Sinusoidal transaction generator 202 generates synthetic transactions to be applied to servers 103–105 across network 102. The number of synthetic transactions varies sinusoidally over time. These transactions are applied to one category of service as discussed above in conjunction with FIG. 1.

In one embodiment of the present invention, each category of service being varied by sinusoidal transaction generator 202 is cycled, individually over time, so that each category of service can be analyzed.

In another embodiment of the present invention, multiple categories of service are varied simultaneously as is described below with reference to FIGS. 5 and 6.

Fixed transaction generator 204 provides a fixed number of transactions over time for the other categories of services being provided by servers 103–105. These fixed rate transactions provide response time measurements for the categories of service other than the category being controlled. The system uses these response times to calculate dependencies between the category of service being controlled and the other categories of service as described below in conjunction with FIG. 4.

Transaction processor 206 aggregates the synthetic transactions from sinusoidal transaction generator 202 and from fixed transaction generator 204 and sends them to servers 103–105 across network 102. Transaction processor 206 processes each transaction up to the point where servers 103–105 are ready to commit the transaction. At this point, the transaction is cancelled.

Response time measurer 208 operates in conjunction with transaction processor 206 to determine the response time—or wait time—associated with the synthetic transaction. Response time measurer 208 saves all of the response times in a table for processing by dependency calculator 210.

Dependency calculator 210 calculates the dependencies between the response time for each service category as is described below in conjunction with FIG. 4.

Measuring Transaction Response Times for a Single Category

Figure 3:
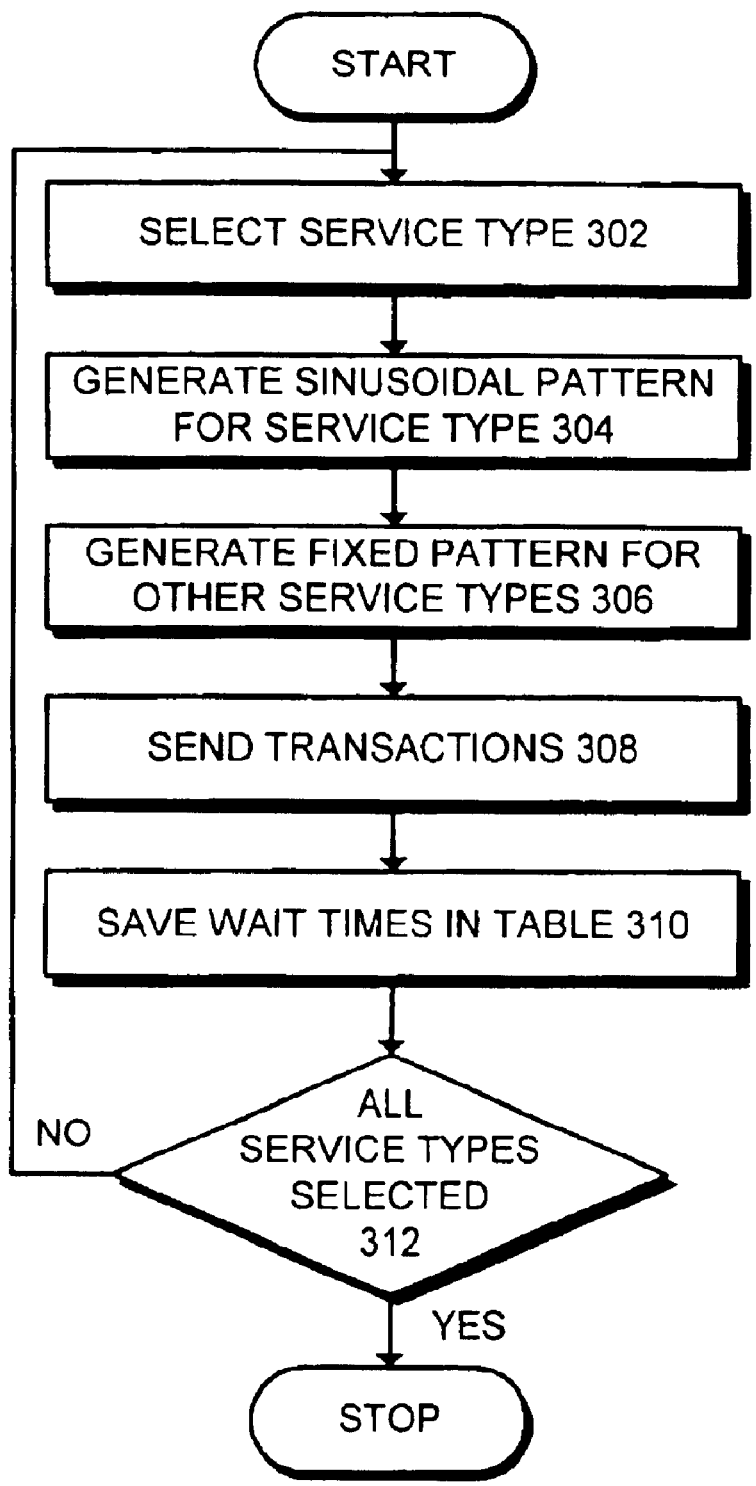
FIG. 3 presents a flowchart illustrating the process of generating synthetic transactions and measuring response times in accordance with an embodiment of the present invention.

FIG. 3 is a flowchart illustrating the process of generating synthetic transactions and measuring response times in accordance with an embodiment of the present invention. The system starts when synthetic transaction generator 110 selects a service category to be controlled (step 302). Sinusoidal transaction generator 202 then generates a sinusoidally varying pattern of synthetic transactions for this service category (step 304). At the same time, fixed transaction generator 204 generates a fixed pattern of synthetic transactions for all other service categories supplied by servers 103–105 (step 306).

Next, transaction processor 206 applies these synthetic transactions to servers 103–105 across network 102 (step 308). As described above in conjunction with FIG. 2, transaction processor 206 processes each transaction up to the point where servers 103–105 are ready to commit the transaction. At this point, the transaction is cancelled. Note that the period of the sinusoid used to vary the number of synthetic transactions can be very long, possibly measured in hours. Response time measurer 208 measures the response times for these transactions and stores the response times as wait times in a table (step 310). This table is indexed by time of transaction and contains the wait times for the various categories of service. In one embodiment of the present invention, a different table is created for each service type.

Finally, synthetic transaction generator 110 determines if all service categories have been varied by sinusoidal transaction generator 202 (step 312). If not, the process returns to 302 to select another service category. Otherwise, the process is complete.

Figure 4:
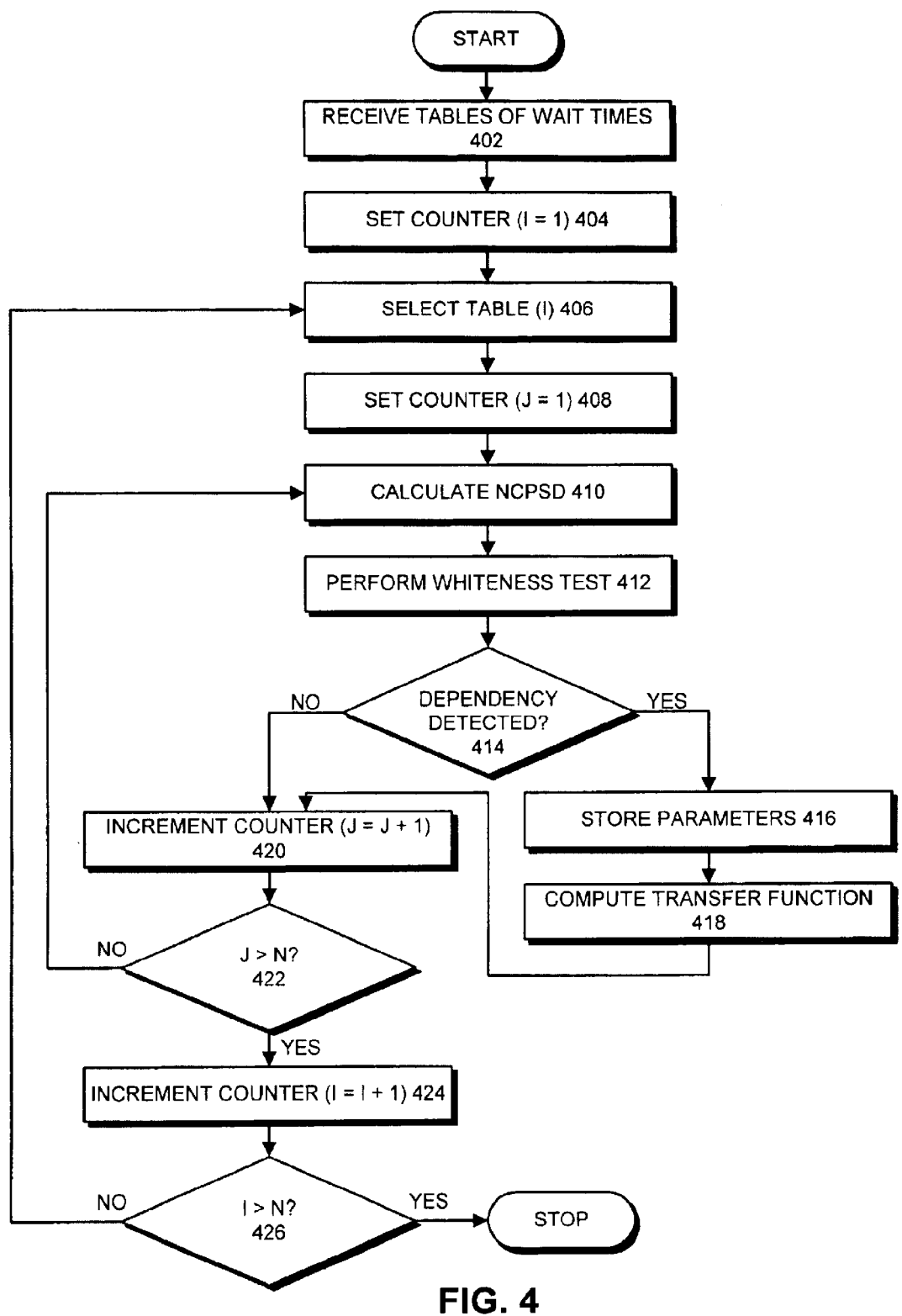
FIG. 4 presents a flowchart illustrating the process of quantifying the effects of transactions of one category on transactions of other categories in accordance with an embodiment of the present invention.

In one embodiment of the present invention, synthetic transaction generator 110 generates a synthetic workload that is sent to servers 103–105 while servers 103–105 are processing a normal workload, so that the pattern of synthetic transactions is added to the normal workload Determining Dependencies for a Single Category at a Time FIG. 4 is a flowchart illustrating the process of quantifying the effects of transactions of one category on transactions of other categories in accordance with an embodiment of the present invention. The system starts when dependency calculator 210 within synthetic transaction generator 110 receives tables of wait times from response time measurer 208 for all service types (step 402).

Note that the transactions generated by the fixed transaction generator may occur at intervals that are not quite fixed intervals because it is difficult to get a particular action to occur at a precise time. To compensate for this difficulty, Cubic Spline Interpolation may be used. Cubic Spline Interpolation is well-known in the art, and is available in MatLab™ (MatLab™ is a product of The MathWorks, Natick, Mass.). Next, dependency calculator 210 sets counter I to 1 (step 404).

Also note that this description uses counters I and J to control the process. The counter I indexes the service category being controlled by sinusoidal transaction generator 202, while the counter J indexes all of the other categories of service offered by servers 103–105. However, note that mechanisms other than counters can be used to control this process.

Next, dependency calculator 210 selects the table associated with service category I (step 406). After selecting the table, dependency calculator 210 sets counter J to 1 to select a column from the table to analyze for dependency on service category I (step 408). Dependency calculator 210 then performs a bivariate normalized cross power spectral density computation (NCPSD) on the pair of wait times (step 410). Details of the bivariate NCPSD computation are well known in the art and can be found in *Spectral Analysis and Its Applications* by Jenkins, G. M. and Watts, D. G. (1968, Holden-Day, San Francisco, Calif.).

After calculating the NCPSD, dependency calculator 210 performs a Kolmagrov-Smirnov test for whiteness to determine if a dependency exists between transactions of one category of service and transactions of other categories of service (step 412). The Kolmagrov-Smirnov test is a standard frequency domain statistical test that is well known in the art and can be found in *An Introduction to Stochastic Processes,* $2^{nd}$ Ed. (1966, Cambridge University Press). Next, dependency calculator 210 determines if a dependency was detected by the Kolmagrov-Smirnov test (step 414).

If a dependency was detected, dependency calculator 210 stores the values of both counters I and J, and the value returned from the NCPSD (step 416). Next, dependency calculator 210 computes and stores the transfer function coefficients at the excitation frequency or frequencies used by sinusoidal transaction generator 202 to drive the service category (step 418). Note that these transfer function coefficients are the final output of the system and can be used by a system analyst to determine the effects that one service has on other categories of service supplied by servers 103–105.

After computing the transfer functions at step 418, or if no dependency was detected at step 414, dependency calculator 210 increments counter J (step 420). Next, dependency calculator 210 determines if counter J has been incremented past the last available service (step 422). If not, the process returns to step 410 to calculate the next NCPSD.

If counter J has been incremented past the last available service, dependency calculator 210 increments counter I and resets the counter J to a value of one (step 424). After incrementing counter I, dependency calculator 210 determines if counter I has been incremented past the last service being tested for creating a dependency (step 426). If so, the process is ended, otherwise the process returns to 406 to select the next table.

Dynamically Characterizing Multiple Input Variables Simultaneously

Figure 5:
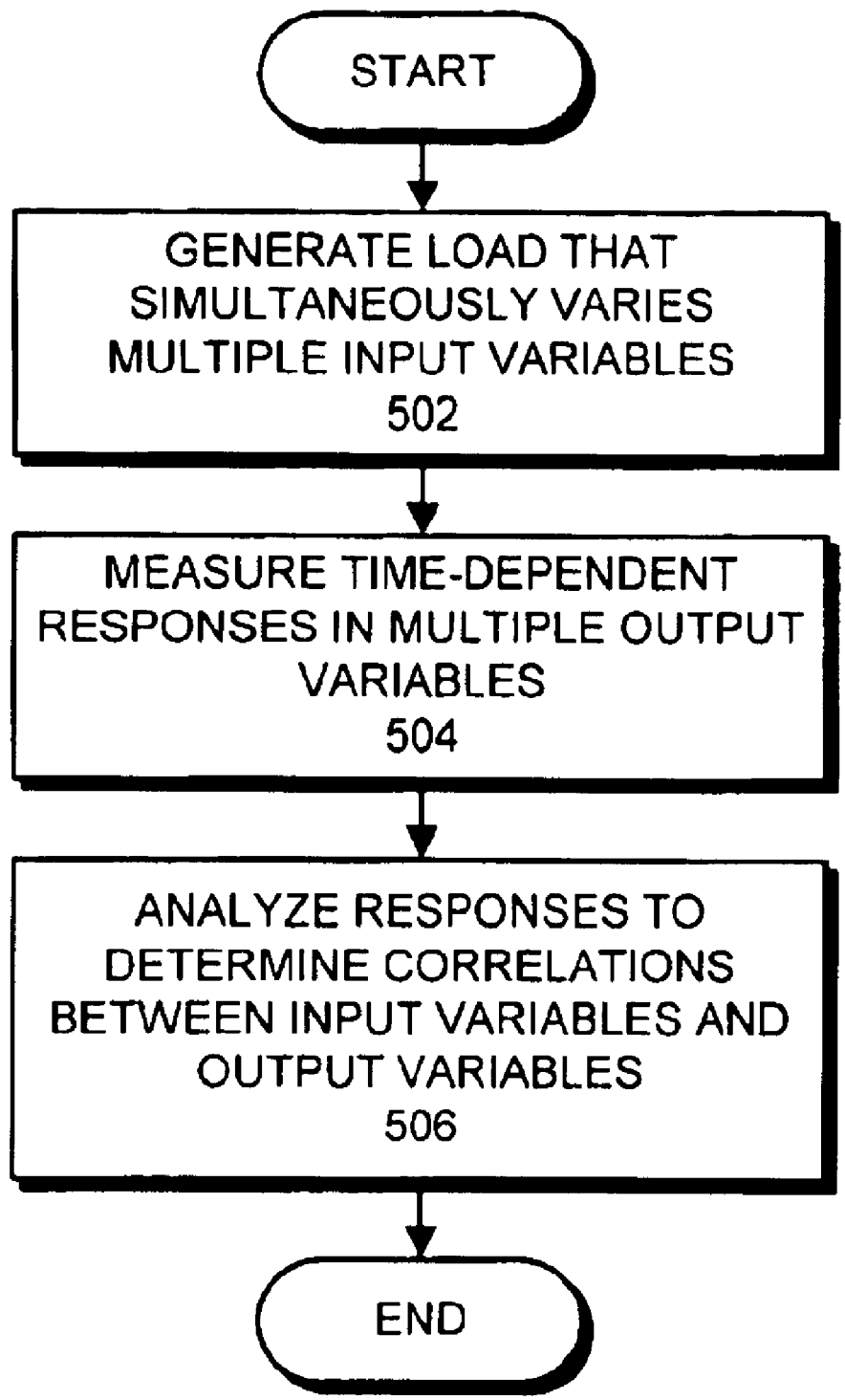
FIG. 5 is a flowchart illustrating the process of dynamically characterizing system performance by varying multiple input variables simultaneously in accordance with an embodiment of the present invention.

FIG. 5 is a flow chart illustrating the process of dynamically characterizing system performance by varying multiple input variables simultaneously in accordance with an embodiment of the present invention. This process works similarly to the process for varying a single input variable discussed above, except that instead of varying only a single input variable, multiple input variables are varied at the same time.

During operation, the system generates a load that varies multiple input variables simultaneously (step 502). The system simultaneously measures responses in multiple output variables (step 504). Next, the system analyzes the responses to determine correlations between input variables and output variables (step 506).

While generating the load in step 502, one embodiment of the present invention uses a multi-frequency sinusoidal excitation approach to superimpose a periodic perturbation with very small amplitude on X. The spectral decomposition of resulting responses in other performance variables Y(i), i=1, 2, 3, ..., N, determines the coupling coefficients among all elements of the system, thereby characterizing the dynamical system behavior.

In order to diagnose the dependability interactions among system parameters, the periodic variation introduced in the system may be sinusoidal with respect to time. One embodiment of the present invention uses the concentric-hypersphere perturbation technique to generate nearly ideal sinusoidal impulsional perturbations in multiple input variables simultaneously. This technique employs an advanced mathematical technique called Gaussian Quadrature, which was originally developed for discrete-ordinates approximations to neutron diffusion equations for high-energy physics. See "Concentric-Sphere Design for Spacing of Tag-Gas Isotopic Ratios," K. C. Gross, Nuclear Technology Journal, Vol. 45 (September 1979).

Once multi-frequency sinusoidal perturbations have been superimposed on desired input parameters, a spectral decomposition analysis during step 506 determines the correlation among system variables by calculating the signal amplification in a periodogram, which plots the power spectral density of the signal as a function of period (with units of time). Note that for noisy process variables with large random components, conventional time-domain cross-correlation methods fail.

The technique introduced above can accurately assess cross-correlation among multiple dynamic system parameters, even with extremely small signal-to-noise ratios. In addition to cross-correlation among response variables, the technique also provides: dynamical coupling coefficients between input variables and any number of response variables; and phase shifts (which can be expressed differently to give lag times) between "cause" and "effect" variables throughout the dynamic system.

Laboratory experiments have shown that systems with chaotic dynamics and high noise levels are not amenable to univariate spectral decomposition calculations via conventional Fourier analysis because the signal-to-noise ratio is too small to discern the sinusoidal perturbation in the response variables. To overcome this limitation of conventional Fourier analysis methods, one embodiment of the present invention employs the Normalized Cross Power Spectral Density (NCPSD) technique. See "Investigation of Nonrecoil Fission-Product Release Phenomena Using Multifrequency Source-Perturbation Experiments in EBR-II," K. C. Gross and L. K. Polley, Annals of Nuclear Energy, Vol. 18 (3), pp. 419–441 (1986). This bivariate diagnostic technique is highly sensitive even to weakly coupled parameters with very poor signal-to-noise ratios. It dramatically and selectively amplifies the input sinusoid harmonics in response variables such that the period of the sinusoidal perturbation in the control variable is readily apparent with the sharpest peak resolution and lowest noise and "side lobe" contamination.

Multi-frequency sinusoidal parameter stimulation, coupled with NCPSD analysis, can provide richly detailed diagnostics without encountering the Heisenberg Effect (an undesirable effect wherein the act of measuring the dynamics of a system can distort—or in the worst case, crash—the system under surveillance). Concentric hyperspheres that trace out sinusoids has significant advantages for simultaneously driving coupled harmonics into two or more system input variables, allowing for monitoring of multiple input and output performance parameters that fully characterize the dynamical behavior, diagnosability, and margining robustness for systems. Additionally, this process can be applied to comprehensively determine true availability budgeting and QOS metrics from the end user's perspective.

Concentric Hypersphere Perturbation Technique

Figure 6:
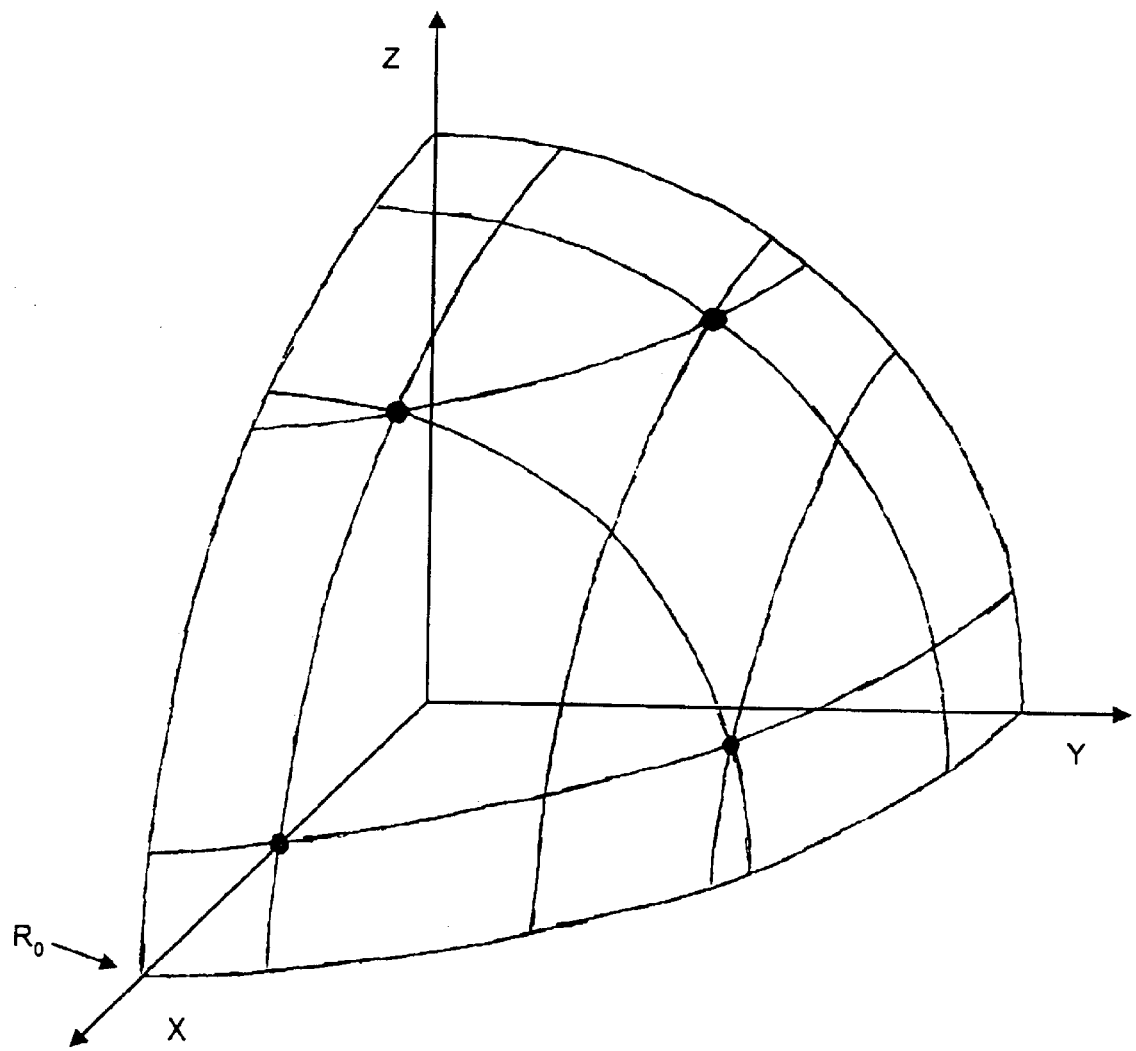
FIG. 6 illustrates the concentric-hypersphere perturbation technique in accordance with an embodiment of the present invention.

FIG. 6 illustrates the concentric-hypersphere perturbation technique in accordance with an embodiment of the present invention. The first step in generating a load that varies multiple input variables simultaneously is to compute a set of geometric cosines, $\mu_i$, with the equation, $$\mu_i = \left[\sin^2\frac{\pi}{4N_I} + \frac{(i-1)}{(N_I-1)}\left(1 - 3\sin^2\frac{\pi}{4N_I}\right)\right]^{\frac{1}{2}}, i = 1, 2, \ldots, N_I. \quad (1)$$

Equation (1) is derived from angular Quadrature relationships used in discrete-ordinates approximations to the neutron transport equation. Here, $N_I$, the number of cosines in the positive $\mu$ direction, is the subscript of the commonly used $S_n$ discrete-ordinates scheme. Use of equation (1) ensures that the resulting system will posses complete symmetry with respect to the origin, and that the distances between each node and all of its closest neighbors are equalized as nearly as possible.

Using the set of $\mu_i$ generated by equation (1), the locations of the nodes for the sphere are determined from, $$(X^n, Y^n, Z^n) = (R\mu_i, R\mu_j, R\mu_k), i=1, 2, \ldots N_I, j=1, 2, \ldots, (N_I-i+1), k=N_I+2-i-j,$$

where $(X^n, Y^n, Z^n)$ are the coordinates of node n on the surface of the sphere, and where R is the radius of the sphere. Note that as indices i and j vary from 1 to $N_I$ and from 1 to $(N_I-i+1)$, respectively, n varies from 1 to $M_I$, where $M_I$, the total number of nodes on the sphere, is equal to $4N_I(N_I+1)$. FIG. 6 depicts a few nodes from the positive octant of the sphere.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for dynamically characterizing computer system performance by varying multiple input variables simultaneously, comprising:
    simultaneously varying multiple input variables to the computer system, wherein simultaneously varying multiple input variables allows dynamically characterizing the computer system performance, wherein varying the multiple input variables to the computer system involves using the concentric-hypersphere perturbation technique to generate very nearly ideal sinusoidal impulsional perturbations in the multiple input variables simultaneously;
    gathering performance results by measuring time-dependent responses in one or more response variables;
    whereby responses to variations in the multiple input variables can be measured simultaneously; and
    analyzing the performance results to determine correlations between input variables and output variables.

2. The method of claim 1, wherein varying the multiple input variables to the computer system involves varying a single input variable using a composite periodic disturbance comprising-multiple distinct frequencies.

3. The method of claim 1, wherein varying the multiple input variables to the computer system involves using multiple amplitudes for varying a single input variable.

4. The method of claim 1, wherein analyzing the performance results involves performing a normalized cross power spectral density (NCPSD) analysis on the performance results.

5. The method of claim 1, wherein simultaneously varying the multiple input variables involves:
    generating a pattern of synthetic transactions; and
    sending the pattern of synthetic transactions to the computer system.

6. The method of claim 5, wherein the pattern of transactions is sent to the computer system while the computer system is processing a normal workload, so that the pattern of synthetic transactions is added to the normal workload.

7. The method of claim 5, wherein the pattern of synthetic transactions includes a varying pattern of synthetic transactions.

8. The method of claim 7, wherein the pattern of transactions additionally includes a fixed pattern of synthetic transactions.

9. A computer-readable storage medium storing instructions that when executed by a computer cause the computer to perform a method for dynamically characterizing computer system performance by varying multiple input variables simultaneously, the method comprising:
    simultaneously varying multiple input variables to the computer system, wherein simultaneously varying multiple input variables allows dynamically characterizing the computer system performance, wherein varying the multiple input variables to the computer system involves using the concentric-hypersphere perturbation technique to generate very nearly ideal sinusoidal impulsional perturbations in the multiple input variables simultaneously;
    gathering performance results by measuring time-dependent responses in one or more response variables;
    whereby responses to variations in the multiple input variables can be measured simultaneously; and
    analyzing the performance results to determine correlations between input variables and output variables.

10. The computer-readable storage medium of claim 9, wherein varying the multiple input variables to the computer system involves varying a single input variable using a composite periodic disturbance comprising multiple distinct frequencies.

11. The computer-readable storage medium of claim 9, wherein varying the multiple input variables to the computer system involves using multiple amplitudes for varying a single input variable.

12. The computer-readable storage medium of claim 9, wherein analyzing the performance results involves performing a normalized cross power spectral density (NCPSD) analysis on the performance results.

13. The computer-readable storage medium of claim 9, wherein simultaneously varying the multiple input variables involves:
    generating a pattern of synthetic transactions; and
    sending the pattern of synthetic transactions to the computer system.

14. The computer-readable storage medium of claim 13, wherein the pattern of transactions is sent to the computer system while the computer system is processing a normal workload, so that the pattern of synthetic transactions is added to the normal workload.

15. The computer-readable storage medium of claim 13, wherein the pattern of synthetic transactions includes a varying pattern of synthetic transactions.

16. The computer-readable storage medium of claim 15, wherein the pattern of transactions additionally includes a fixed pattern of synthetic transactions.

17. An apparatus that dynamically characterizes computer system performance by varying multiple input variables simultaneously, comprising:

a workload generator that is configured to simultaneously vary multiple input variables to the computer system, wherein simultaneously varying multiple input variables allows dynamically characterizing the computer system performance, wherein the workload generator is configured to use the concentric-hypersphere perturbation technique to generate very nearly ideal sinusoidal impulsional perturbations in the multiple input variables simultaneously;

a measurement mechanism that is configured to gather performance results by measuring time-dependent responses in one or more response variables;

whereby responses to variations in the multiple input variables can be measured simultaneously; and an analysis mechanism that is configured to analyze the performance results to determine correlations between input variables and output variables.

18. The apparatus of claim 17, wherein the workload generator is configured to vary a single input variable using a composite periodic disturbance comprising multiple distinct frequencies.

19. The apparatus of claim 17, wherein the workload generator is configured to use multiple amplitudes for varying a single input variable.

20. The apparatus of claim 17, wherein the analysis mechanism is configured to perform a normalized cross power spectral density (NCPSD) analysis on the performance results.

21. The apparatus of claim 17, wherein the workload generator is configured to:

generate a pattern of synthetic transactions; and to send the pattern of synthetic transactions to the computer system.

22. The apparatus of claim 21, wherein the pattern of transactions is sent to the computer system while the computer system is processing a normal workload, so that the pattern of synthetic transactions is added to the normal workload.

23. The apparatus of claim 21, wherein the pattern of synthetic transactions includes a varying pattern of synthetic transactions.

24. The apparatus of claim 23, wherein the pattern of transactions additionally includes a fixed pattern of synthetic transactions.

* * * * *